UNITED STATES PATENT OFFICE.

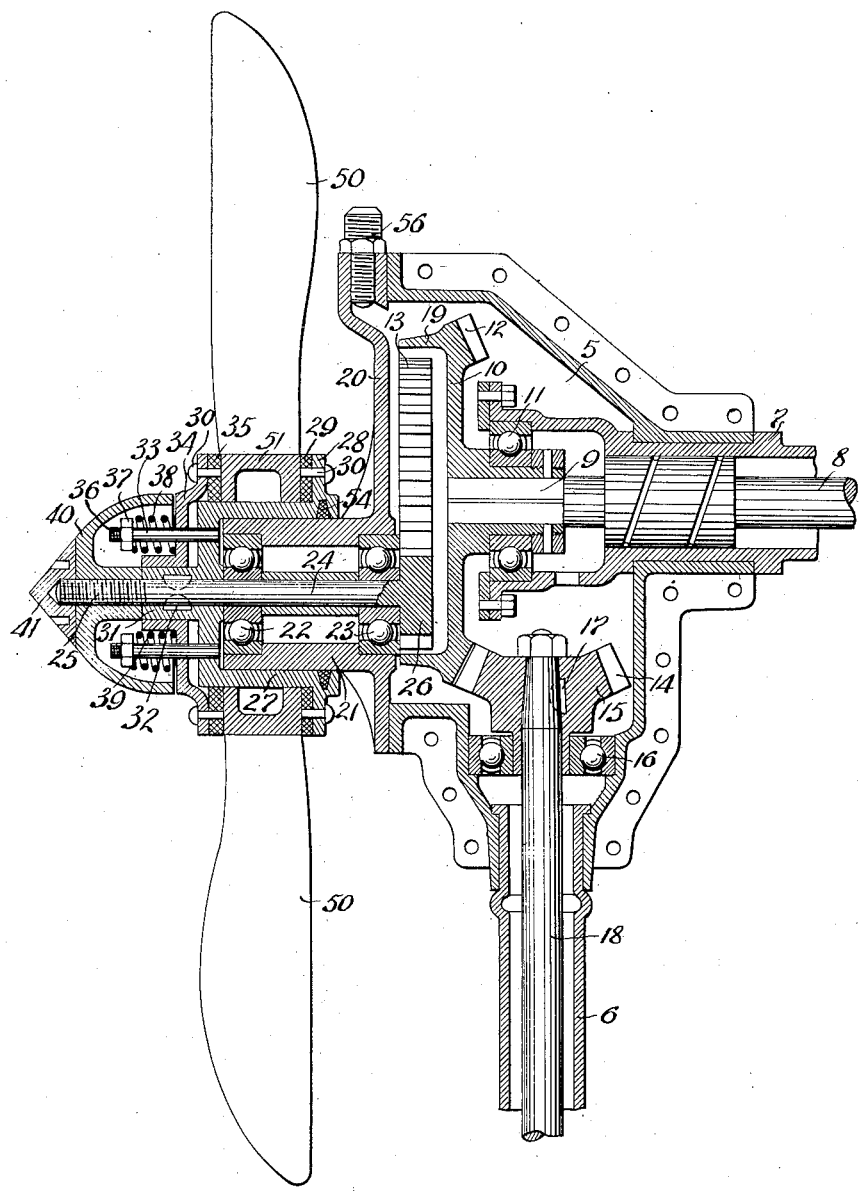

VICTOR W. PAGÉ, OF NEW YORK, N. Y.

FAN DRIVE.

1,411,126. Specification of Letters Patent. Patented Mar. 28, 1922.

Application filed March 15, 1921. Serial No. 452,471.

*To all whom it may concern:*

Be it known that I, VICTOR W. PAGÉ, a citizen of the United States, and a resident of the city of New York, Kew Gardens, borough of Queens, in the county of Queens and State of New York, have invented new and useful Improvements in Fan Drives, of which the following is a full, clear, and exact description.

The present invention relates to new and useful improvements in internal combustion motors, and it pertains more particularly to cooling fans therefor.

It is one of the primary objects of the invention to provide a gearing for driving the cooling fan of a motor vehicle motor in lieu of the belt drive commonly used in this connection.

A further object of the invention is to operate the fan-driving gearing by the same power transmission element as furnishes the power for the cam shaft of the motor.

A further object of the invention is to provide a device of this character which is especially adapted to motors of the overhead valve type.

A further object of the invention is to so construct a cooling fan that the blades thereof are free to have a slipping movement relative to the driving hub.

It is a still further object of the invention to so construct and arrange the various parts of the device in order that thorough lubrication thereof may be had.

With the above and other objects in view, reference is had to the accompanying drawing in which the figure is a sectional view of my improved device illustrating the mechanism thereof.

Referring more particularly to the drawing, the reference character 5 designates a gear housing or casing, and said gear housing or casing is supported from the crank case of the motor by means of a tubular standard 6, said tubular standard being secured at its lower end to the crank case housing or other suitable portion of the motor base.

Mounted in the gear housing or casing 5, is a second housing 7 and in the housing 7 is mounted a cam shaft 8. The cam shaft 8 has its outer end squared as at 9, and mounted on said squared outer end is a gear 10 mounted in roller bearings 11 which in turn are secured to the outer end of the cam shaft housing 7. This gear 10 is constructed in such a manner as to provide two sets of teeth 12 and 13, the set of teeth 12 being a bevel set and adapted to mesh with the teeth 14 of a bevel gear 15. This bevel gear 15 is mounted in a roller bearing 16 and is keyed by means of a key 17 to a vertical shaft 18 mounted in the tubular standard 6. The gear 10 is provided on its side opposite to the teeth 12, with a flange 19, and the teeth 13 heretofore mentioned are formed upon the inner face of the flange 19 in such a manner as to provide an internal gear.

From the foregoing it will be apparent that as the shaft 18 is driven the gear 10 will be rotated through the medium of the gear 15, and upon rotation of the gear 10, the cam shaft 8 will be rotated in order that the same may function to open and close the several valves of the motor through the medium of a suitable valve-operating mechanism not forming a part of the present application.

The casing or housing 5 is closed by a front wall 20, and said front wall 20 is provided with a forwardly projecting tubular extension 21. Mounted in the ends of this tubular extension 21 are roller bearings 22 and 23, and rotatably mounted within the roller bearings 22 and 23 is a shaft 24, the outer end of which is screw-threaded as at 25, for a purpose to be hereinafter more clearly described. The inner end of this shaft 24 is provided with a gear 26 and said gear 26 meshes with an internal gear formed by the teeth 13 on the inner face of the flange 19 in such a manner that as the gear 10 is rotated the shaft 24 will be likewise rotated. The reference character 27 designates the hub member of the fan and said hub member of the fan is rotatably mounted upon the exterior of the tubular extension 21. This hub member 27 is provided with a flange 28 and the inner face of said flange is lined with a suitable friction surface 29 secured thereto by means of rivets 30. Projecting forwardly from the hub member 27, is an extension 31. Keys 32 are carried by the extension 31 and engage the shaft 24 in such a manner that as the shaft 24 is rotated the hub member 27 will likewise be rotated on the tubular extension 21.

Projecting forwardly from the hub member 27 is a plurality of bolts or pins 33. These bolts or pins are rigidly secured to the hub member 27 and form the means for slidably mounting a plate 34, the inner face of which is provided with a friction surface 35 similar to the friction surface 29 heretofore mentioned. The outer ends of these bolts or pins 33 are screw threaded as at 36, for the reception of nuts 37, and interposed between the nuts and the plate 34 and surrounding each of the bolts or pins 33, is a coil spring 38, by means of which the plate 34 is yieldably mounted. This plate 34 is provided with a tubular extension 39 which engages the tubular extension 31 of the hub member 27 and forms a bearing for the said plate 34.

The reference character 40 designates a hollow nut secured to the shaft 24 by means of engagement with the screw 25 and said hollow nut 40 is adapted to enclose the outer ends of the pins or bolts 33 and the springs 38. Engaging the hollow nut 40 and threaded upon the shaft 24 is a lock nut 41.

The reference character 50 designates the fan and said fan is provided with a hub portion 51 mounted upon the hub member 27 and freely rotatable thereon. This hub portion 51 is provided with oppositely disposed flat faces adapted for engagement with the friction surfaces 29 and 35 in order that the fan may operate in unison with the hub member 27.

The hub member 27 is provided with an internal groove in which is mounted a suitable packing 54 forming the means for preventing an escape of the lubricant employed to thoroughly lubricate the several parts. This lubricant is introduced into the casing 5 through the nipple 56 secured in the top of said housing, it being understood that the lubricating system is suitably connected with this nipple 56.

Having thus described the invention, the operation thereof is as follows: Assuming that the shaft 18 is driven, through the medium of the bevel gear 15 the gear 10 will be driven and the cam shaft 8 will be rotated. Upon rotation of the gear 10, the internal gear thereof formed by the teeth 13, by reason of its engagement with the gear 26, will set up a rotation of the shaft 24. Upon rotation of the shaft 24, the hub member 27 through the medium of the keys 32, will be rotated with said shaft. Upon rotation of the hub member the fan 50 will be rotated by reason of the frictional engagement of the friction surfaces 29 and 35 with the fan hub member 51. Assuming now that excessive resistance be offered to the blades of the fan 50, the force exerted by said resistance will cause a slipping of the fan relative to the hub member 27, owing to the fact that the plate 34 is free to move against the action of the springs 38 upon the bolts or pins 33 and relieve the gripping action of the friction surface 35 which permits of the fan sliding longitudinally of the hub member 27 until the friction surface 29 relieves its grip, thus permitting the fan 50 to rotate upon the hub member 27.

I claim:

1. A driving means for the cooling fans of motors comprising in combination with the cam shaft and its driving element, a double gear carried by said cam shaft, a fan shaft, a fan carried by the fan shaft, and means meshing with one of the sets of teeth of said double gear to drive the fan shaft, said means being carried by said fan shaft.

2. In combination with the cam shaft of a motor, a gear carried thereby, said gear being formed with a plurality of external bevel teeth and a plurality of internal straight teeth, means meshing with the bevel teeth of said gear to drive said gear, and cam shaft, a fan, a fan shaft, and means carried by said fan shaft and meshing with the internal set of straight teeth for driving said fan shaft and fan.

3. In a device of the character described, a housing, means for supporting said housing, a cam shaft mounted in the housing, a double gear carried by the cam shaft, means for meshing with one of the series of teeth of said double gear to drive said gear, and cam shaft, a tubular extension projecting from one of the walls of said housing, a fan shaft mounted in said tubular extension, a fan carried by said fan shaft, and means engaging the other set of teeth of said double gear for driving said fan shaft and fan.

4. In a device of the character described, a housing, a cam shaft mounted in the housing, a driving gear carried by the cam shaft, means for engaging with said driving gear to drive the same shaft, a fan shaft, a fan carried by said fan shaft, and means carried by the fan shaft and operatively driven by the gear carried by the cam shaft, substantially as described.

5. In a device of the character described, a housing, a cam shaft mounted in the housing, a drive shaft mounted in the housing at right angles to the cam shaft, a fan shaft mounted in the housing at right angles to the second-mentioned shaft, means for driving the cam shaft and the fan shaft from the second-mentioned shaft, said means comprising an external gear meshing with the gear carried by the second-mentioned shaft, and an internal gear meshing with a gear carried by the fan shaft.

6. In a device of the character described, a housing, a cam shaft mounted in the housing, a drive shaft mounted in the housing at right angles to the cam shaft, a fan shaft mounted in the housing at right angles to the second-mentioned shaft, means for driving the cam shaft and the fan shaft from the second-mentioned shaft, said driving means comprising a double gear carried by the cam shaft and meshing with a gear carried by the second-mentioned shaft, and a gear carried by the fan shaft.

7. In a device of the character described, a housing, a cam shaft mounted in the housing, a drive shaft mounted in the housing at right angles to the cam shaft, a fan shaft mounted in the housing at right angles to the second-mentioned shaft, and means for driving the cam shaft and the fan shaft from the second-mentioned shaft, said driving means comprising a gear carried by the cam shaft and formed with a circular set of external angularly disposed teeth and a second set of internal straight teeth. the angular teeth of the gear meshing with a gear carried by the second-mentioned shaft and the straight internal teeth meshing with a gear carried by the fan shaft.

8. In combination with the cam shaft of a motor and its driving means, a fan shaft, and means operated directly from the cam shaft for driving said fan shaft, said means comprising an internal gear mounted upon the cam shaft and meshing with a gear carried by the fan shaft.

9. A cooling fan for motors comprising a hub member provided with a flange, means for driving said hub member, a second flange spaced with respect to the first-mentioned flange and adapted for sliding movement relative thereto, friction surfaces carried by the inner face of each of said flanges, and a fan loosely mounted on the hub member and adapted to be engaged by the friction surfaces to cause a rotation of the fan in unison with the hub member.

10. In a device of the character described, a housing, a tubular support therefor, a vertical shaft mounted in said tubular support, a gear wheel carried by said vertical shaft, a cam shaft mounted in the housing, a gear carried by said cam shaft, said gear having a plurality of angularly disposed teeth adapted to mesh with the teeth of the gear carried by the vertically disposed shaft, a fan shaft, a fan carried thereby, and means for driving said fan shaft, said driving means comprising a gear carried thereby, and a series of gear teeth carried by the gear mounted on the cam shaft, said second-mentioned series of teeth being adapted to mesh with the gear carried by the fan shaft.

VICTOR W. PAGÉ.